United States Patent
Ross et al.

(10) Patent No.: US 7,359,976 B2
(45) Date of Patent: Apr. 15, 2008

(54) METHOD AND SYSTEM FOR IMPROVED INTERNET SECURITY VIA HTTP-ONLY COOKIES

(75) Inventors: David A. Ross, Redmond, WA (US); Cem Paya, Seattle, WA (US); Aaron Goldfeder, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1368 days.

(21) Appl. No.: 10/303,113

(22) Filed: Nov. 23, 2002

(65) Prior Publication Data

US 2004/0103200 A1    May 27, 2004

(51) Int. Cl.
*G06F 15/16* (2006.01)
(52) U.S. Cl. .......... 709/229; 709/203; 709/225
(58) Field of Classification Search .......... 709/203, 709/225, 229
See application file for complete search history.

(56) References Cited

U.S. PATENT DOCUMENTS

| | | | |
|---|---|---|---|
| 6,185,567 B1 * | 2/2001 | Ratnaraj et al. | 709/203 |
| 6,421,729 B1 * | 7/2002 | Paltenghe et al. | 709/229 |
| 6,985,953 B1 * | 1/2006 | Sandhu et al. | 709/229 |
| 2003/0023873 A1 * | 1/2003 | Ben-Itzhak | 713/201 |
| 2003/0159063 A1 * | 8/2003 | Apfelbaum et al. | 713/200 |
| 2004/0015580 A1 * | 1/2004 | Lu et al. | 709/224 |

* cited by examiner

*Primary Examiner*—Phuoc Nguyen
(74) *Attorney, Agent, or Firm*—Workman Nydegger (57) ABSTRACT

A system and method that prevents certain cookies, as specified by an Internet server, from being accessed through client-side script, thereby mitigating the amount of damage that cross-site scripting attacks can accomplish. The server marks selected cookies with an attribute that flags such cookies as being protected, and a security mechanism in the client prevents protected cookies from being accessed via script. A protected (flagged) cookie can still be accessed by the server, (e.g., via HTTP), while non-flagged cookies can be accessed by the server or script. An API or similar layer implements the security mechanism that checks for the attribute, and fails requests for any cookies having that attribute set. The present invention can also be adapted to prevent a malicious script from overwriting existing HTTP-only cookies on a client machine.

19 Claims, 6 Drawing Sheets

METHOD AND SYSTEM FOR IMPROVED INTERNET SECURITY VIA HTTP-ONLY COOKIES

FIELD OF THE INVENTION

The invention relates generally to computer systems and the Internet, and more particularly to Internet security.

BACKGROUND OF THE INVENTION

The Internet, which in essence includes a large number of networked computers distributed throughout the world, has become an extremely popular source of virtually all kinds of information. Increasingly sophisticated computers, software, and networking technology have made Internet access relatively straightforward for end users. For example, conventional browser software allows a user to request information such as a web page from a web site on one or more remote computers. To this end, the user provides the address of the web page (e.g., a uniform resource identifier, or URI) in some manner to the browser software, and the browser software transmits the request using a well known communication protocol such as the HyperText Transport Protocol (HTTP). The request is then routed to the destination computer or web site based on the address.

When the request is received, the remote web site evaluates the request and returns an appropriate response, which may include the information requested in some formatted content, e.g., a HyperText Markup Language (HTML) format. The browser software parses and interprets the returned content to render a page or the like upon the user's computer display.

When accessed, some web sites attempt to store information on the user's computer, in a small text file referred to as a cookie. Cookies provide for HTTP state management, by which a server may correlate multiple requests coming from the same client. Many times this is desirable to the user, e.g., so that the user does not have to repeatedly resubmit information manually to the remote computer hosting the web site, but instead can automatically provide the information as stored in the cookie. For example, a user can allow cookies to be stored on his or her computer so as to be able to view some web sites, and/or to take advantage of desirable customization features, such as local news and weather, or stock quotes. As can be appreciated, cookies may include sensitive and personal information, or the keys needed to get to a user's sensitive and personal information. For example, a cookie may be used as an authenticator, e.g., a cookie can contain a ticket that grants the user access to some restricted resource, such as a personal account at an online brokerage.

Because of the ability to store and exchange sensitive and personal information, Internet security has become a significant concern to individual users, software manufacturers and providers of Internet content. One way in which Internet security is provided on the client side is via cross domain access rules, which generally ensure that for any received content, that content can only interact with content from the same web domain. For example, a typical page on www.1a2b.com can freely script content on any other page on www.1a2b.com, but cannot script to pages that are located on a different web domain. An enforcement mechanism ensures that only pages with identical domain properties are allowed to freely interact on the client side.

A relatively recent but common security problem is cross-site scripting. Cross-site scripting is a server-side vulnerability that enables malicious script (e.g., written by a hacker) to execute on a client machine in the domain of that vulnerable server. In general, cross-site scripting tricks a user into sending a malicious script to the server, and the server then returns the script as part of the server's returned content. When the content is interpreted, the script is executed in the security context of the server's domain.

By way of example, consider a web site that, after a user logs in, redirects the user to a welcome page that returns content based on information passed in the URL, e.g., www.1a2b.com/default.asp?name=username redirects the user to a welcome page, that when rendered at the client, greets the user by the username that was provided. However, if a script instead of the username is provided, vulnerable servers will pass back the script, and when the welcome page is rendered, the script will be executed on the client side. Thus, if a hacker tricks the user into clicking on a link to that site with a malicious script (instead of the username) sent to the server, such as www.1a2b.com/default.asp?name=<script>evilScript( )</script>, the web site passes back the script embedded into its content, as if it was the username. When the browser interprets this part of the content as script, the browser automatically runs the script, which is normal browser behavior. However, because the script came from the site, the script is able to instruct the browser to perform operations in that site's domain, including send that site's cookie or cookies to another computer, such as the hacker's computer. In this manner, cross site-scripting can steal cookies, and thus a hacker can obtain a user's sensitive information. The problem is difficult to detect at both clients and servers, since servers often return content based on information passed with a URL, and clients often run scripts returned from a server.

SUMMARY OF THE INVENTION

Briefly, the present invention provides a system and method that prevent Internet (or Intranet) server-specified cookies from being accessed through client-side script, thereby mitigating the amount of damage that cross-site scripting can accomplish. In one implementation, a cookie is marked (e.g., at the server) with an attribute that flags the cookie as being an "HTTP-only cookie," whereby a security mechanism prevents the cookie from being accessed via an API (e.g., the InternetGetCookie( ) API) that scripts use to retrieve cookies. The flagged cookie can still be accessed via HTTP by the server.

To this end, the API or similar layer (e.g., in the scripting engine or in the internet transport component that retrieves cookies) includes a security mechanism that checks for the attribute, and fails requests for any cookies having that attribute set. Other cookies may be retrieved normally, whereby, for example, non-protected cookies (e.g., those without sensitive information) can be accessed via script.

The present invention can also be adapted to prevent a malicious script from overwriting existing HTTP-only cookies on a user's machine, which although not as harmful as stealing cookies, can still cause mischief. An override mechanism can also be provided so that in certain (e.g., carefully controlled) circumstances, the security mechanism will allow cookies to be accessed via the API or the like.

Other advantages will become apparent from the following detailed description when taken in conjunction with the drawings, in which:

DETAILED DESCRIPTION

Exemplary Operating Environment

Figure 1:
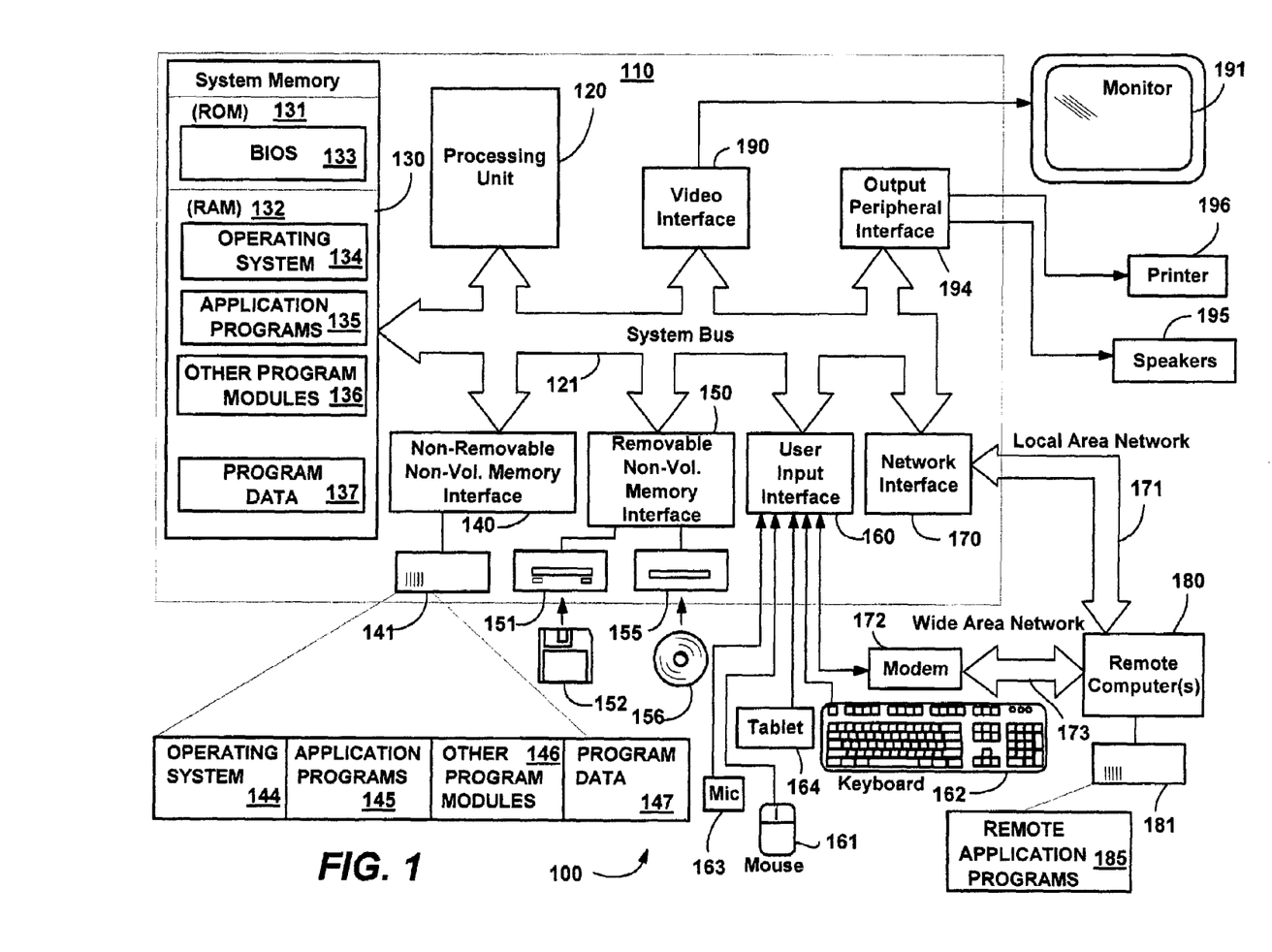
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. I may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

HTTP-Only Cookies

One aspect of the present invention is generally directed towards the concept of handling cookies, which typically comprise small text files written by web sites to a machine that is requesting content from those sites. Cookies may also be saved to a client machine via script interaction with the document object model (DOM), a W3C standard, e.g., the script sets a cookie by invoking properties of the DOM, which is implemented by the parser/script engine which then invokes the InternetSetCookie( ) API). Once saved on a machine, the cookies may be retrieved by the web site, or retrieved by script (e.g., via DOM interaction that causes the parser/script engine to invoke the InternetGetCookie( ) API). As will be understood, one aspect of the present invention limits the cookies that can be accessed by script via such an API or the like (or accessed by a similar, unsafe non-HTTP entity, such as an applet). As generally used herein, "unsafe content" includes script or any other such content that is possibly malicious, such as provided in a cross-site scripting attack.

Figure 2:
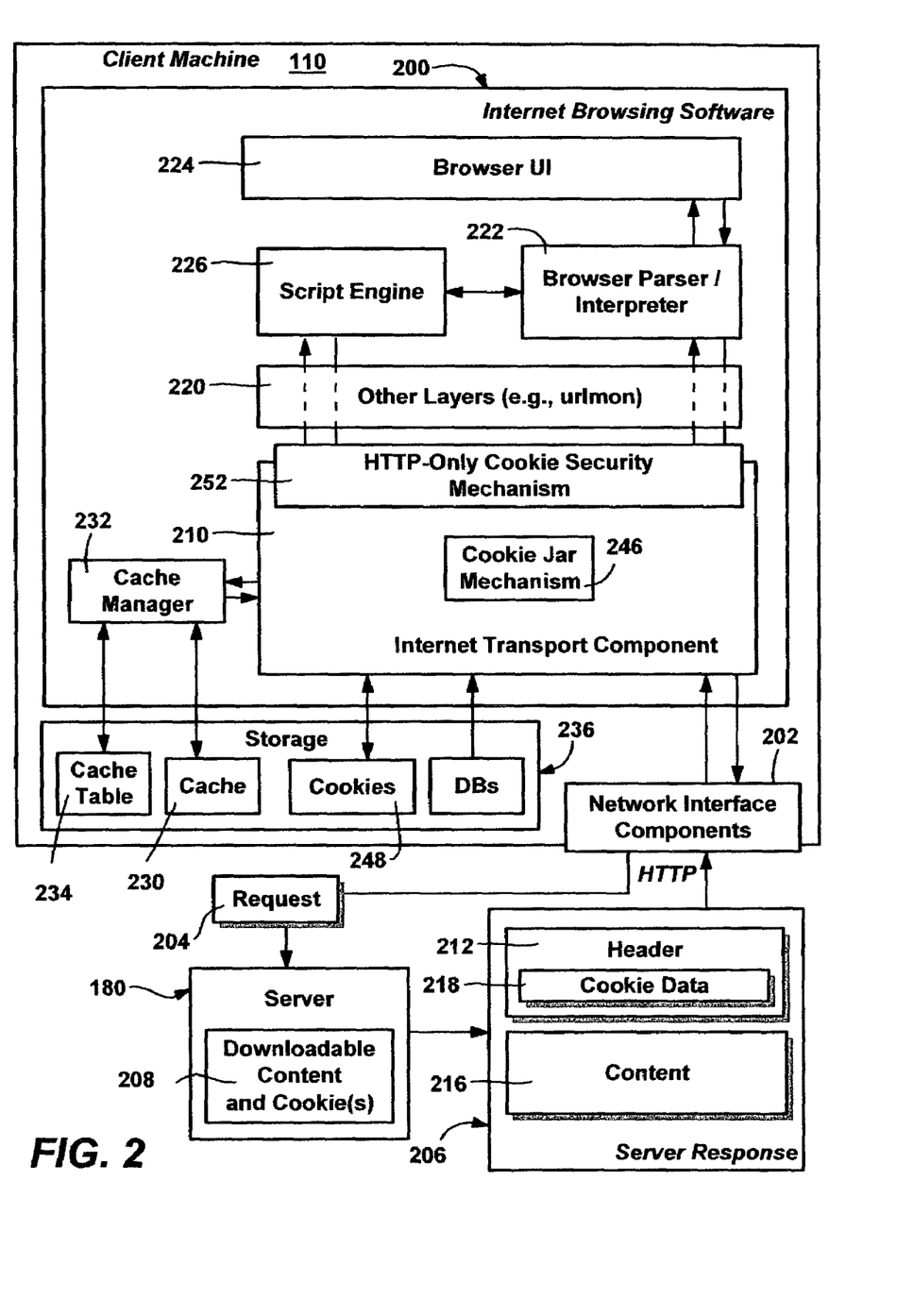
FIG. 2 is a block diagram generally representing components for requesting and handling Internet content in accordance with one aspect of the present invention.

FIG. 2 shows a generalized conceptual model of one implementation of the present invention, in which browsing software 200 executing in a client machine (e.g., the computer system 110 of FIG. 1) communicates via a network interface software and hardware 202 with a remote server (e.g., one of the remote computer(s) 180 of FIG. 1). The communication may include requests for content or the like (e.g., HTTP "GET" requests) such as the request 204, and result in responses such as the response 206 being received from the server 180. Communication between the client 110 and the server 180 typically uses a well-known network protocol, such as hypertext transfer protocol (HTTP). As used herein, "server" or "network server" includes any machine or combination of machines having content and (in keeping with an aspect of the present invention as described below) cookies maintained thereon or in association therewith, shown in FIG. 2 as the block labeled 208. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

As further represented in FIG. 2, an internet transport component 210 (e.g., wininet.dll) handles much of the processing of the response 206. Part of the response 206 comprises one or more headers 212. As also represented in FIG. 2, the server response 206 may include the requested content 216 and/or cookie (data) 218, such as within the header 212.

When content 216 is returned, the content is passed from the internet transport component 210 (possibly through other layers of code 220) to browser parser/interpreter code 222 that parses and interprets the content for displaying to the user via a browser user interface 224. The browser parser/interpreter code 222 may invoke a script engine 226 as needed to interpret any script embedded in or referenced by the content. Similar content also may be stored in a local cache 230 accessed via a cache manager 232 that is included in or otherwise associated with the internet transport component 210. For example, the cache manager component 232 manages the cache by maintaining site-to-local-file mappings in a cache table 234 or the like, such that the content and related data may be locally accessed as appropriate. Note that although FIG. 2 shows a single storage unit 236 (e.g., the hard disk drive 141 of FIG. 1) as maintaining the various data, as is understood the data may be maintained in and/or distributed among separate storage units.

Figure 3:
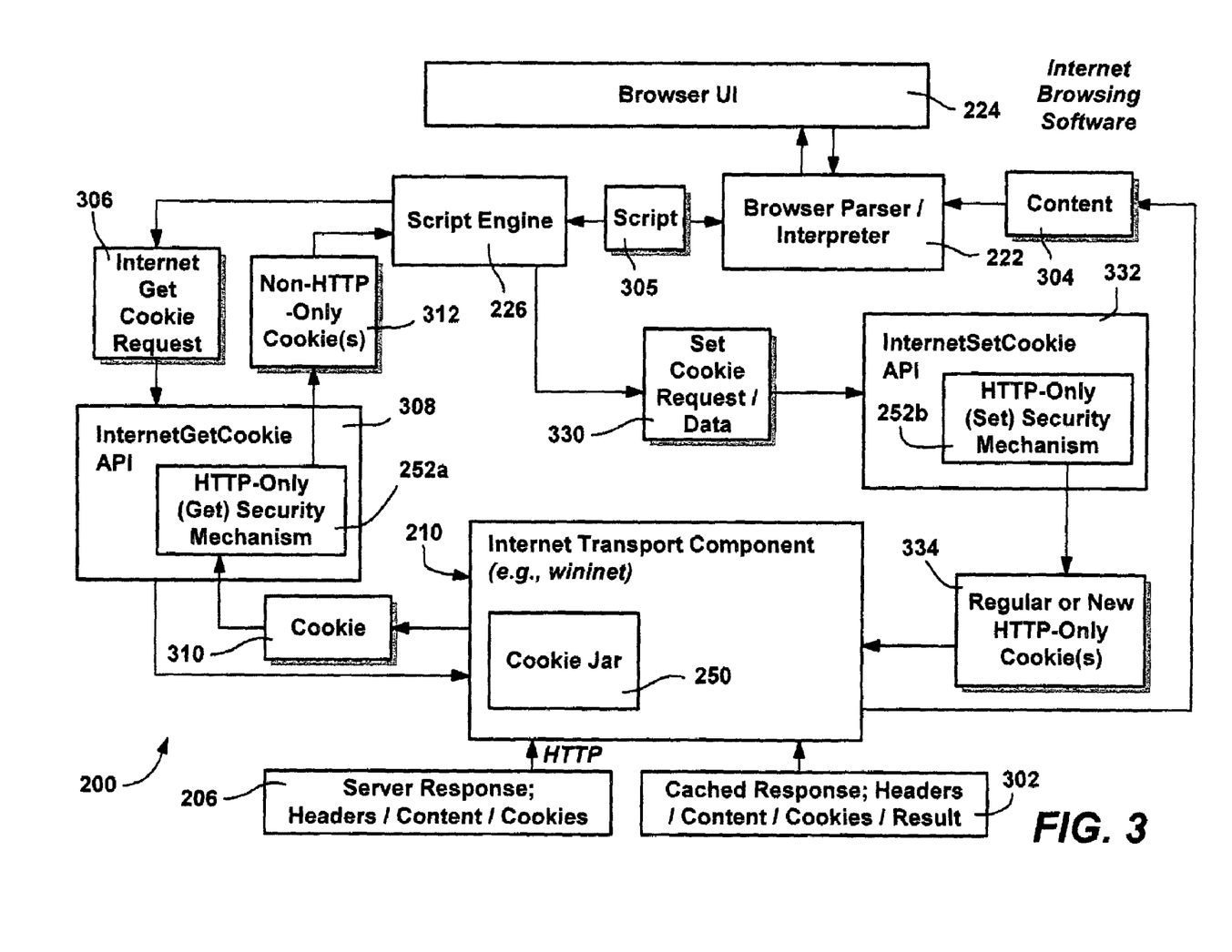
FIG. 3 is a block diagram generally representing data exchanged among components in a client machine, with the selective blocking of access to certain cookies in accordance with one aspect of the present invention.

The internet transport component 210 includes or is otherwise associated with a mechanism that stores and retrieves cookies, referred to as cookie jar mechanism 246. Although the cookies 248 are maintained in the system storage 236, for simplicity the mechanism 246 (which executes in RAM) and stored cookie data 248 (which may reside in RAM, non-volatile storage or a combination of both) may be together considered as a cookie jar 250 (FIG. 3).

In accordance with one aspect of the present invention, the internet transport component 210 includes or is otherwise associated with an HTTP-only cookie security mechanism 252 that determines access to cookies, based on the presence or absence of an HTTP-only attribute. For cookies that the server wants to prevent access to, the server sets the HTTP-only attribute on the client cookie, e.g., in the HTTP response header, as described below. Otherwise this attribute is omitted. The following example shows the syntax used in one such header (note that the HttpOnly attribute is not case sensitive):

Set-Cookie: <name>=<value>[; <name>=<value>]
[; expires=<date>] [; domain=<domain_name>]
[; path=<some_path>] [; secure] [; HttpOnly]

As can be appreciated, other mechanisms are equivalent, e.g., a bit value in a byte flag can provide the HttpOnly information. Also, extended attributes or flags may be implemented, such as an "HttpOnlyWarn" attribute that blocks access and also warns the user that unsafe content (e.g., script) is attempting to access an HttpOnly protected cookie, or an "HttpOnlyPrompt" attribute that generates a prompt when unsafe content (e.g., script) is attempting to access a protected cookie, and lets the user decide whether to allow access. As used herein, a cookie with the HttpOnly attribute set will be referred to as an Http-only cookie, an HttpOnly-protected cookie, or simply a protected cookie. Also, such cookies may be referred to elsewhere as HTTP Header Only cookies.

The HttpOnly-protected cookie operates normally with respect to HTTP communications. For example, when the "HttpOnly" attribute is included in the response header, the cookie is sent as normal when the user browses to a web site in the valid domain. However, in keeping with the present invention and as described below, access to the protected cookie through unsafe content (e.g., script) is denied, even to the web site that set the cookie in the first place. As a result, if a cross-site scripting bug exists, and the user is tricked into clicking a link that exploits this bug, the browser code will not be able to access the cookie on behalf of a third party, thereby protecting the information maintained in the cookie. It should be noted that the present invention prevents scripting access to such protected cookies, and thereby mitigates the risk of cross-site scripting, but does not completely eliminate other cross-site scripting security problems.

FIG. 3 generally represents one client-side implementation that prevents access to HTTP-only cookies. In FIG. 3, many of the components are also represented in FIG. 2, as indicated by like numbers.

In general, the server response 206 may include cookie data that the internet transport component 210 adds to the cookie jar 250, or the cookie jar may already have cookies for this site from a previous access to that site, or by being copied in another way. In any event, one or more cookies for that site have been received at the client machine, and the internet transport component 210 receives content from the site corresponding to those cookies, such as from a server response 206 or a cached response 302 located in the browser cache or caches. The internet transport component 210 extracts the content 304 from the response and provides that content 304 to the browser parser/interpreter 222.

If the content 304 includes script 305, the browser parser/interpreter 222 invokes the script engine 226 to run the script 305. One action that the script 305 may perform is to request a cookie, shown in FIG. 3 by an Internet get cookie request 306, performed via script interaction with the DOM (e.g., by referencing a "document.cookie" object) which is then translated by the scripting engine into a call to an Internet-GetCookie API 308. In the implementation shown, the InternetGetCookie API 308 (which may be part of the internet transport component 210) passes the request to the internet transport component 210, and receives the requested cookie 310 therefrom.

In accordance with one aspect of the present invention, the InternetGetCookie API 308 includes or is otherwise associated with an HTTP-only security mechanism 252*a*, which evaluates the cookie data for the presence of the HTTP-only attribute. If found, the request is failed, whereby as represented in FIG. 3, only cookies 312 without this attribute will be made accessible to the script 305 via the script engine 226. In this manner, the web site can set one or more selected cookies with an HTTP-only attribute, and thereby restrict sensitive information for visitors that use web browsers that recognize this HTTP-only attribute, thereby mitigating cross-site scripting attacks for cookies.

It should be noted that associating the HTTP-only Security Mechanism 252*a* with the InternetGetCookie API 308 (e.g., internally as shown or as a layer above or below the API) provides a conveniently located enforcement mechanism, since the script engine (of which there may be various kinds) need not be modified. Similarly, with this implementation, the transport component 210 can simply retrieve cookies when requested by a caller, and need not be concerned with which entity is requesting the cookie. It should be understood, however, that it is relatively straightforward to implement the enforcement mechanism at any of these other levels, and thus such alternative implementations are equivalent. For example, the internet transport component and/or cookie jar mechanism may be programmed to know the source of the request, whereby non-HTTP requests for HTTP-only cookies may be rejected at this lower level. Similarly, the parser and/or scripting engine may be arranged to detect requests for cookies and block access to protected ones.

Figure 4:
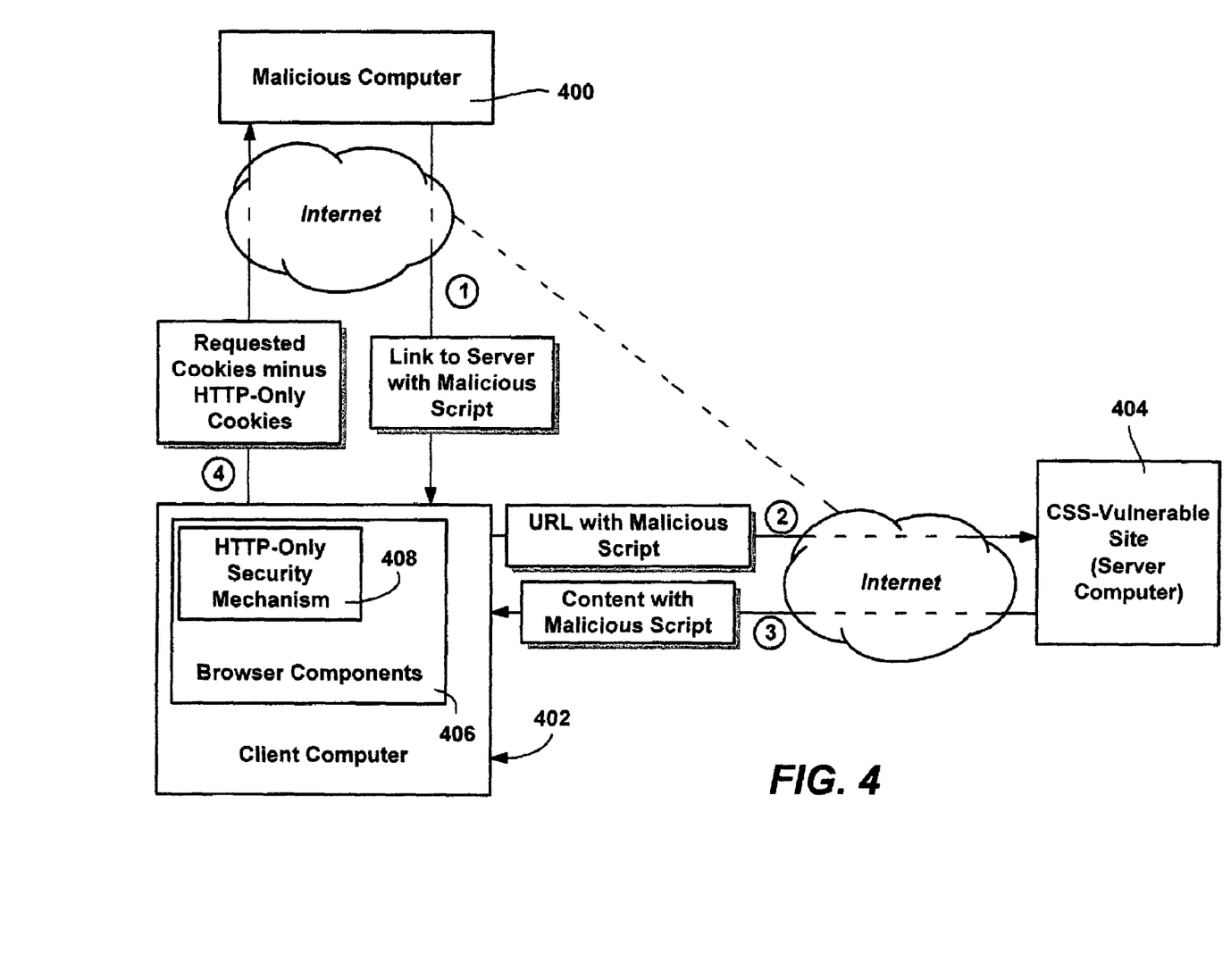
FIG. 4 is a block diagram generally representing the communications between a malicious computer attempting cross-site scripting via a client machine and server with protected cookies being blocked from access in accordance with one aspect of the present invention.

FIG. 4 represents the operation of the present invention during a cross-site scripting attack. As represented by the arrow labeled one (1), a malicious computer 400 sends a link to a client computer 402 to a cross-site scripting vulnerable site 404. The link includes malicious script, such that when the link is clicked on, the malicious script is sent (arrow labeled two (2)) to the cross-site scripting vulnerable site 404, which returns it in some way (e.g., directly or after some redirection) as part of its returned content to the client computer 402 (arrow labeled three (3)).

In accordance with an aspect of the present invention, the browser components 406 at the client computer 402 operate as described above, including executing the script. If the script (via the scripting engine's API call) requests the cookies that correspond to the site's domain, the HTTP-only security mechanism 408 in the client computer 402 blocks access to any requested cookies having the HTTP-only attribute set thereon. Thus, the malicious computer (or another computer) will not receive those that the site has set with the HTTP-only attribute, although it may receive a site's other cookies in this way. As long as the site operators set this attribute for cookies with sensitive information, the site and user are protected from cross-site scripting involving cookies marked with this attribute, even if the site is otherwise vulnerable to cross-site scripting attacks.

Although not necessary to the present invention, FIG. 3 also shows that the browser components can be arranged to prevent script from overwriting existing HTTP-only cookies. While not as harmful as having cookie data stolen, having a valuable cookie replaced with another is undesirable. For example, script may request a cookie be added to the cookie jar, by having the scripting engine pass the cookie data 330 to the InternetSetCookie API 332. An HTTP-only security mechanism 252b associated with this API 332 can communicate with the internet transport component 210 to determine whether that cookie already exists in the cookie jar 250, and if so, whether that existing cookie is marked as an HTTP-only cookie. If so, the set cookie request will be denied, whereby only unprotected (non-HTTP-only) cookies or new (not previously existing) HTTP-only cookies 334 can be set by script.

It should be noted that when a web site sets an HTTP-only cookie on a web browser that does not support HTTP-only cookies, in some implementations the cookie is ignored or downgraded to a traditional, scriptable cookie. This leaves information vulnerable to attack for users of such web browsers. In an enterprise, administrators may require the use of a web browser that recognizes HTTP-only cookies, thereby ensuring that protected cookie information is not disclosed with a cross-site scripting bug as described above. For a public web site where it is necessary to support multiple web browsers, client-side script may be used to determine the browser version for each visitor, and/or the client may send this information with an HTTP GET request. The web site can then decide on how to handle cookie data, e.g., provide sensitive information via HTTP-only cookies only to those visitors using web browsers which recognize the HTTP-only attribute, to prevent script from accessing such cookies. Visitors with web browsers which do not support HTTP-only cookies may be given limited (e.g., only non-sensitive) information and/or functionality, possibly along with a request to upgrade their software.

Figure 5:
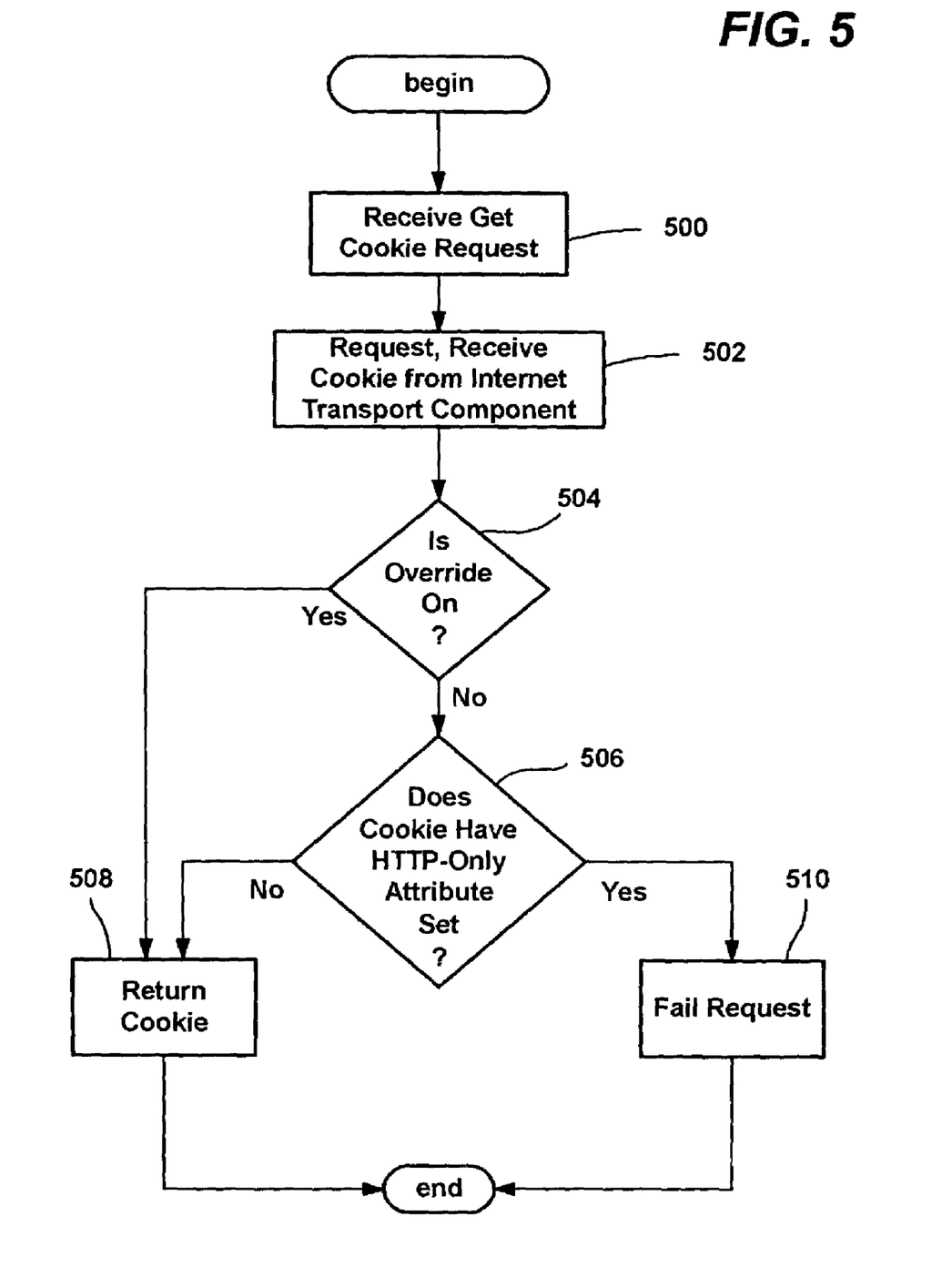
FIGS. 5 and 6 are flow diagrams generally representing exemplary logic and related operations performed by a security mechanism to block access to HTTP-only cookies in accordance with one aspect of the present invention.

FIG. 5 represents general logic of the security mechanism, suitable for implementing in the API that retrieves cookies, or at a similar level. Beginning at step 500 of FIG. 5, the security process generally begins when an incoming request to get a cookie is received, in the example implementation, indirectly from script at the API. At step 502, the process requests and receives the requested cookie from the internet transport component. Although not shown in FIG. 5 for purposes of simplicity, it is understood that other mechanisms are in place that may deny the request, e.g., the requested cookie needs to exist, has to correspond to the appropriate domain, and so forth, to possibly be returned.

Although not necessary to the invention, step 504 represents an optional override that may be present, to essentially bypass the HTTP-only security mechanism of the present invention. More particularly, in certain (carefully controlled) circumstances, it may be desirable to have access to all cookies via the API. An override (e.g., which can only be activated by a special program, and not by web-page script and/or when web-page script is running) may be provided for this purpose, and if on as detected by step 504, will bypass the security mechanism of the present invention and get the cookie at step 508.

Typically the override will not be on, and step 506 will be executed to determine whether the requested cookie has the HTTP-only attribute set on it. If not, the cookie is returned at step 508, otherwise the request is failed (or ignored) via step 510. Note that the failure code returned by the API may be the same as if the cookie did not exist, (rather than indicate "exists but protected"), whereby the script will not receive any knowledge of the cookie. Further, the API can trigger an event or the like whereby other components (e.g., a monitoring component) can be made aware of the request.

Figure 6:
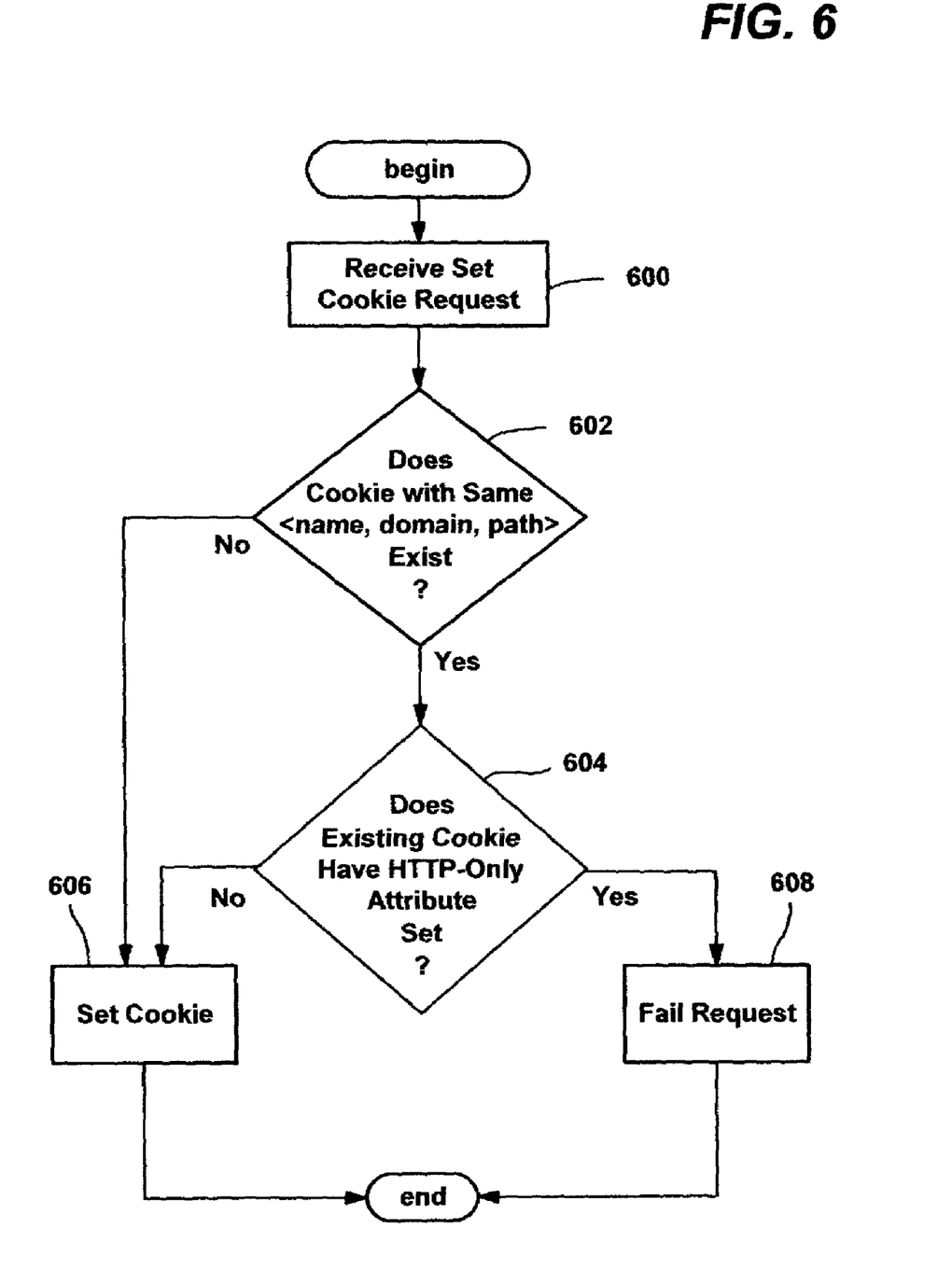

FIG. 6 provides the general (optional) logic for preventing the overwriting of an HTTP-only protected cookie through the set cookie API, beginning at step 600 where the set cookie request is received. Step 602 checks whether a cookie with the same name, domain and path exists. If not, the cookie is set at step 606. If so, step 602 branches to step 604 to test whether the existing cookie has the HTTP-only attribute set, whereby if not, the script is allowed to overwrite the cookie at step 606, otherwise the request is failed at step 608.

As can be seen from the foregoing detailed description, there is provided a method and system to protect specially flagged cookies from being accessed by script-based requests or the like, thereby defeating the ability of a cross-site scripting attack to obtain sensitive data via those cookies. The method and system are relatively straightforward to implement, yet provide significant security benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving data from a web site at a transport component, the data including unsafe content;
   parsing and interpreting the unsafe content received via the transport component, including invoking an engine to execute code present in the unsafe content, the code requesting access to a cookie; and
   determining at a security mechanism operably connected to the browser component whether the cookie is accessible to the unsafe content based on information associated with the cookie, wherein the security mechanism is configured to deny access to the cookie when the information indicates that the cookie is not accessible to the unsafe content,
   wherein the unsafe content requests return of a cookie via a function called by the engine, and wherein the function obtains the information associated with the cookie from the transport component for evaluation by the security mechanism.

2. The method of claim 1 wherein the unsafe content corresponds to script, and wherein receiving the request comprises receiving a function call initiated by the script.

3. The method of claim 1 wherein determining whether the cookie is protected comprises looking for the presence of a particular attribute in data of the cookie.

4. The method of claim 1 wherein the request to access the cookie corresponds to a get cookie request, wherein the information does not indicate that the cookie is protected, and further comprising, returning the cookie.

5. The method of claim 1 wherein the request to access the cookie corresponds to a get cookie request, wherein the information indicates that the cookie is protected, and wherein denying the request comprises returning an error in response to the request.

6. The method of claim 1 further comprising, receiving the script in a response generated at a remote web site.

7. The method of claim 6 further comprising, passing the script to the remote web site in a request for content.

8. The method of claim 1 wherein the request to access the cookie corresponds to a set cookie request, wherein the information indicates that the cookie is protected, and wherein denying the request comprises returning an error in response to the request.

9. The method of claim 1 further comprising, at a content server, providing the information associated with the cookie that indicates that the cookie is protected.

10. The method of claim 9 wherein providing the information associated with the cookie comprises adding an attribute to data of the cookie.

11. A computer-readable storage medium having stored computer-executable instructions for performing the method of claim 1.

12. In a computing environment, a system comprising:
   a transport component that receives a response from a web site, the response including unsafe content;
   a browser component that parses and interprets the unsafe content received via the transport component, including invoking an engine to execute code present in the unsafe content, the code requesting access to a cookie; and
   a security mechanism operably connected to the browser component, the security mechanism configured to determine whether the cookie is accessible to the unsafe content based on information associated with the cookie, the security mechanism further configured to deny access to the cookie when the information indicates that the cookie is not accessible to the unsafe content, wherein the unsafe content requests return of a cookie via a function called by the engine, and wherein the function obtains the information associated with the cookie from the transport component for evaluation by the security mechanism.

13. The system of claim 12 wherein the code comprises script and wherein the engine comprises a script engine that runs the script.

14. The system of claim 12 wherein the security mechanism is incorporated into a function called by the engine that runs the code present in the unsafe content.

15. The system of claim 12 wherein the unsafe content requests return of a cookie via a function called by the engine, wherein the information associated with the cookie indicates that the cookie is inaccessible to the unsafe content, and wherein the security mechanism denies the requested return of the cookie.

16. The system of claim 12 wherein the information associated with the cookie comprises an attribute.

17. The system of claim 16 the attribute comprises a text string which when present indicates that the cookie is inaccessible to the unsafe content.

18. A computer-readable storage medium having stored computer-executable instructions for performing a method, comprising:
   receiving a response from a web site;
   interpreting content in the response, including invoking a script engine to run script present in the content;
   receiving a request originating in the script to return a cookie, and in response, calling a function to return the cookie in response; and
   determining whether the cookie is protected from script access by evaluating information associated with the cookie, wherein determining whether the cookie is protected from script access comprises, receiving the cookie by communicating from the function to a transport component to retrieve the cookie, and thereafter evaluating attributes associated with the cookie to determine if at least one attribute indicates the cookie is protected, and
   a) if the information indicates the cookie is not protected, returning the cookie in response to the request; and
   b) if the information indicates the cookie is protected, denying the request.

19. The computer-readable medium having computer-executable instructions of claim 18 wherein the presence of a defined attribute associated with the cookie indicates the cookie is protected.

* * * * *